(12) United States Patent
Beck

(10) Patent No.: US 8,998,271 B2
(45) Date of Patent: Apr. 7, 2015

(54) FIXING DEVICE FOR FIXING AN ACTUATION DEVICE WITH PUSH-PUSH KINEMATICS

(71) Applicant: Illinois Tool Works Inc., Glenview, IL (US)

(72) Inventor: Christian Beck, Rottingen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/949,288

(22) Filed: Jul. 24, 2013

(65) Prior Publication Data

US 2014/0030015 A1     Jan. 30, 2014

Related U.S. Application Data

(63) Continuation of application No. 13/148,745, filed as application No. PCT/US2010/022469 on Jan. 29, 2010, now abandoned.

(30) Foreign Application Priority Data

Feb. 11, 2009    (DE) .......................... 10 2009 008 496

(51) Int. Cl.
    *E05C 5/02*       (2006.01)
    *B60K 15/04*     (2006.01)
    *E05C 19/00*     (2006.01)
    *E05F 1/10*       (2006.01)

(52) U.S. Cl.
    CPC ............ *B60K 15/0406* (2013.01); *B60K 15/04* (2013.01); *E05F 1/105* (2013.01); *E05Y 2900/534* (2013.01)

(58) Field of Classification Search
    USPC ..................................................... 292/57, 261
    See application file for complete search history.

(56) References Cited

U.S. PATENT DOCUMENTS

| | | | | | |
|---|---|---|---|---|---|
| 3,190,092 | A | * | 6/1965 | Patriquin ........................ | 70/370 |
| 4,380,161 | A | * | 4/1983 | Bassi .............................. | 70/168 |
| 4,583,775 | A | * | 4/1986 | Bisbing .......................... | 292/64 |
| 5,076,080 | A | * | 12/1991 | Fuss et al. ...................... | 70/125 |
| 5,152,161 | A | * | 10/1992 | Lee ................................. | 70/127 |

(Continued)

FOREIGN PATENT DOCUMENTS

| | | |
|---|---|---|
| CN | 1303458 A | 7/2001 |
| CN | 1396873 A | 2/2003 |

(Continued)

*Primary Examiner* — Carlos Lugo
*Assistant Examiner* — Faria Ahmad
(74) *Attorney, Agent, or Firm* — Lowe Hauptman & Ham LLP

(57) ABSTRACT

Disclosed is a fixing device for fixing an actuation device with push-push kinematics on a component of a motor vehicle. The fixing device includes a housing with a guiding element and a locking recess on its outer surface, an opening in the component for inserting the actuation device, a guiding element on the component, and a locking projection on the component. The guiding elements of the actuation device and the component corporate such that the actuation device is guided into the opening in a predetermined rotational position, and the locking projection and the locking recess lock with each other upon the actuation device being inserted fully into the opening in the predetermined rotational position, and thus fix the actuation device on the component. The locking can be released again by rotating of the actuation device out of the predetermined rotational position.

20 Claims, 3 Drawing Sheets

(56) References Cited

U.S. PATENT DOCUMENTS

Figure 1:
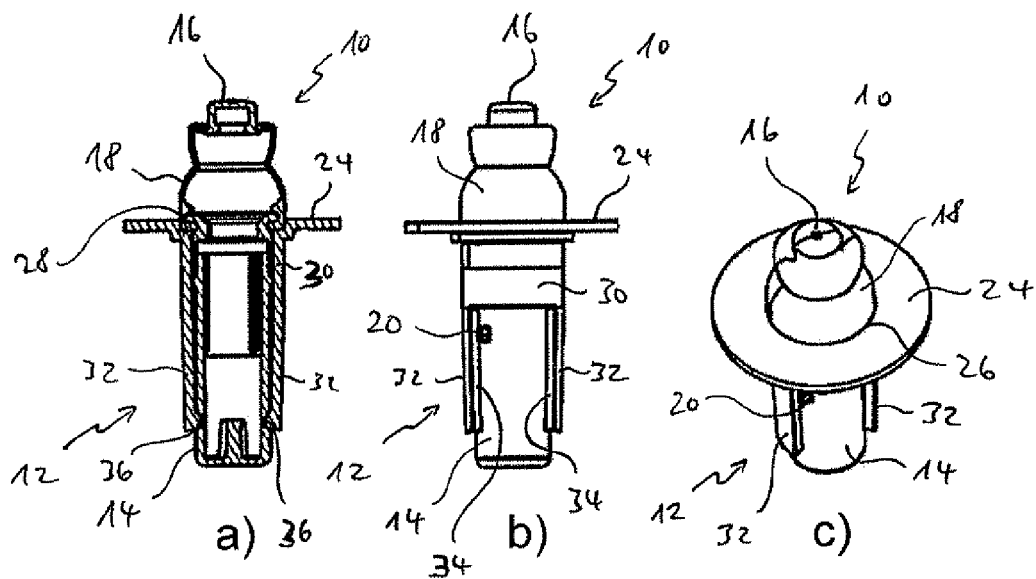

| | | | |
|---|---|---|---|
| 5,400,629 A * | 3/1995 | Myers | 70/491 |
| 6,439,016 B1 | 8/2002 | Wittwer et al. | |
| 6,568,226 B1 * | 5/2003 | Ramsauer | 70/127 |
| 6,640,592 B2 * | 11/2003 | Vickers | 70/83 |
| 6,692,203 B2 | 2/2004 | Kim et al. | |
| 8,191,941 B2 * | 6/2012 | Ramsauer | 292/194 |
| 8,292,113 B2 | 10/2012 | Nakaya | |
| 8,347,677 B2 | 1/2013 | Flandrinck | |
| 2009/0139991 A1 * | 6/2009 | Nakaya | 220/315 |
| 2009/0307869 A1 | 12/2009 | Salice | |

FOREIGN PATENT DOCUMENTS

| | | |
|---|---|---|
| CN | 101283154 A | 10/2008 |
| CN | 201143963 Y | 11/2008 |
| DE | 19650594 A1 | 6/1998 |
| EP | 2017112 A1 | 1/2009 |
| WO | 2008031814 A1 | 3/2008 |

* cited by examiner

FIXING DEVICE FOR FIXING AN ACTUATION DEVICE WITH PUSH-PUSH KINEMATICS

RELATED APPLICATIONS

The present application is a continuation of U.S. application Ser. No. 13/148,745, filed Aug. 10, 2011 and is national phase of PCT/US2010/022469 filed Jan. 29, 2010, and claims priority from German Application Number 10 2009 008 496.7 filed Feb. 11, 2009.

The invention relates to a fixing device for fixing an actuation device with push-push kinematics on a component of a motor vehicle, in particular a fuel filler housing. It is known to assign actuation devices with push-push kinematics to a fuel filler flap of an automobile. In the locked position of the push-push kinematic mechanism, the fuel filler flap is closed. If the locking of the fuel filler flap is released, exerting a pressure on the fuel filler flap enables said fuel filler flap to be pivoted partially outward by virtue of a rod of the push-push kinematic mechanism being unlocked. A spring which is provided in the push-push kinematic mechanism then pushes the rod and therefore the fuel filler flap outward by a certain angle, such that the fuel filler flap can be gripped by hand and pivoted fully open. Such designs make use, for example, of a so-called control wire which interacts with a cardioid curve. Another push-push actuation device is described in the applicant's parallel German patent application with the file reference 10 2008 057 933.5, which was not published before the priority date of the present application.

The fastening of such actuation devices to components of an automobile, for example to a fuel filler housing, takes place by clipping or latching the actuation device to the component. In the event of a defect, it may be necessary to remove the actuation device from the component for the purpose of repair or replacement. In the prior art, this is often possible only by destroying the, for example, latching connection.

The object on which the invention is based is that of providing a fixing device of the type specified in the introduction which, while being cost-effective to produce, enables simple and non-destructive removal of an actuation device from a component of a motor vehicle.

Said object is achieved according to the invention by means of the subject matter of claim 1. Advantageous refinements can be found in the dependent claims, in the description and in the figures.

The invention achieves the object by means of a fixing device for fixing an actuation device with push-push kinematics on a component of a motor vehicle, in particular a fuel filler housing, comprising an at least in sections cylindrically formed housing of the actuation device with at least one guiding element provided on the outer surface of the housing and at least one locking recess provided also on the outer surface of the housing, further comprising an opening in the component, into which opening the actuation device can be inserted with its housing, and at least one guiding element provided on the component starting from the opening in the insertion direction of the housing, wherein the guiding element of the actuation device and the guiding element of the component, upon insertion of the actuation device into the opening, cooperate such that the actuation device is guided into the opening in at least one predetermined rotational position, and further comprising at least one locking projection provided on the component starting from the opening in the insertion direction of the housing, wherein the locking projection of the component and the locking recess of the housing lock with each other upon the actuation device being inserted fully into the opening in the predetermined rotational position, and thus fix the actuation device on the component, and wherein the locking can be released again by rotating of the actuation device out of the predetermined rotational position.

The actuation device according to the invention is provided for actuating a pivotably mounted flap of a motor vehicle, in particular a fuel filler flap. Said actuation device has a push-push kinematic mechanism as is known per se, the design of which is not of particular importance. It is essential merely that the actuation device is loaded in particular in the longitudinal direction and therefore must be fixed to the component, in particular the fuel filler housing, of the motor vehicle. Such fuel filler housings are conventionally composed of plastic and are inserted into an opening in the vehicle body. The housing of the actuation device may be of substantially completely cylindrical design. The housing diameter in the region of the cylindrical section is substantially equal to the diameter of the in particular circular opening of the component, such that the actuation device can be inserted with the cylindrical section directly into the opening.

The guiding elements permit only the at least one predetermined rotational position as the housing is inserted into the opening. With a corresponding design of the guiding elements, two or more predetermined rotational positions may also be enabled. In any case, the insertion of the housing into the opening takes place in a defined manner.

The at least one locking projection and the at least one locking recess are arranged such that they lock exactly with each other as the housing is inserted in the rotational position predetermined by the guiding elements. When the housing is inserted fully into the opening, therefore, the at least one locking projection of the component and the at least one locking recess come into engagement, for which purpose the locking projection briefly deflects resiliently and subsequently moves back into its original position. The actuation device is then secured in the component in particular in the longitudinal direction so as to be prevented from being pulled out. For removal, the actuation device with its housing is rotated in the opening, for example by 90°, thereby releasing the locking. For unlocking, the at least one locking projection briefly deflects resiliently. In said non-predetermined rotational position, however, the housing cannot be pulled completely out of the opening on account of the guiding elements. Instead, the housing is pulled only slightly out of the opening, and the housing is then subsequently rotated back into the predetermined rotational position, such that the guiding elements can engage into one another again. Here, the at least one locking projection and the at least one locking recess are no longer in engagement. The actuation device can therefore subsequently be pulled completely out of the opening, guided by the guiding elements.

It is possible in particular for at least two locking recesses to be provided on the housing and at least two corresponding locking projections to be provided on the component. This improves the fixing action. Correspondingly, for improved guidance, it is also possible for in each case two corresponding guiding elements to be provided on the housing and on the component.

The fixing device according to the invention enables simple mounting and non-destructive removal of the actuation device on and from the component of the motor vehicle. At the same time, the fixing device can be produced in a simple and cost-effective manner, for example by means of an injection-molding process which is known per se. The component and in particular the locking device may be composed for example of plastic.

In one particularly practical embodiment, the at least one guiding element of the actuation device may be at least one guiding projection provided on the outer surface of the housing, and the at least one guiding element of the component may be at least one guiding groove, said guiding groove extending starting from the opening in the insertion direction of the housing. The actuation device can correspondingly be inserted with its housing into the opening only when the guiding projection engages into the guiding groove. If these are not aligned correctly with one another, an insertion of the housing into the opening is not possible. In the predetermined rotational position, the at least one rib-like guiding projection then engages into the guiding groove and, in this way, said guiding projection is guided by the guiding groove as it is inserted into the opening.

A further embodiment provides that the component comprises at least two hollow cylinder sections each with at least one locking projection, and each starting from the rim of the opening extending in the insertion direction of the housing and each being elastically resilient at least at their end facing away from the rim of the opening, and that the actuation device comprises in each case at least two locking recesses corresponding to the locking projections of the hollow cylinder sections. The hollow cylinder sections may thus be of tongue-like design. With their outer surface, said hollow cylinder sections form in each case only a part of the outer circumference of a hollow cylinder. In the circumferential direction, therefore, said hollow cylinder sections do not run over the entire circumference of the cylinder. Said hollow cylinder sections may be arranged opposite one another, and it is also possible for more than two such sections to be provided. As the actuation device is inserted in the predefined rotational position, the hollow cylinder sections are pushed apart by the housing and in particular by the contact between the outer surface of the housing and the locking projections of the hollow cylinder sections. When the housing has passed with its locking recesses over the locking projections, the projections lock into the recesses, with the hollow cylinder sections moving back into their unloaded position. Correspondingly, during a rotation of the actuation device out of the predetermined rotational position, the hollow cylinder sections initially deflect, such that the locking projections pass out of the locking recesses again. As a result of the rotation, the locking recesses are subsequently situated adjacent to the locking projections. After the device is pulled out of the opening slightly, said device can be rotated back into the predetermined rotational position, with the locking recesses now being situated over the locking projections of the hollow cylinder sections as viewed in the axial direction. The device can now be pulled completely out of the opening in order to be removed.

According to a further refinement, the locking projections can be provided in each case in the area of that end of the hollow cylinder sections which faces away from the rim of the opening. The locking projections are thus situated in the particularly highly resilient flexible area of the hollow cylinder sections. In a further particularly practical embodiment, the hollow cylinder sections can be connected with the rim of the opening and can be free and resiliently flexible at their end facing away from the rim of the opening. Said hollow cylinder sections are thus connected only at one of their ends to the component. In the area of their connection to the opening rim, said hollow cylinder sections are not resiliently flexible. In this way, the opening has a fixed, predefined diameter. The hollow cylinder sections are in particular integrally connected to the rim of the opening and can themselves form at least parts of the opening.

A further embodiment provides that a hollow cylindrical guiding lug extends starting from the rim of the opening in the insertion direction of the housing, and that starting from said hollow cylindrical guiding lug the hollow cylinder sections extend in the insertion direction of the housing, and that the at least one guiding groove is provided in the hollow cylindrical guiding lug. The guiding lug is of completely encircling design in the circumferential direction. The outer surface of said guiding lug forms a complete cylindrical surface. The at least one guiding groove is formed in the guiding lug. A guiding lug of said type increases the stability of the opening. Furthermore, the guiding lug may serve, when the housing is rotated out of the predetermined rotational position for removal, as a stop for guiding projections provided on the housing. In this way, the slight pulling-out of the housing required for mounting when the housing is in the position rotated out of the predetermined rotational position is limited in a defined manner.

On the upper side of the housing, the actuation device may comprise a hood which is composed of flexible material and which is foldable in the axial direction. The component may then also comprise a circumferential collar at the rim of the opening, on which collar the hood circumferentially abuts in the fixed state. The collar forms an encircling step. In the fixed state, the bellows which is conventionally provided in actuation devices with push-push kinematics lies in said encircling step. In this way, the bellows acts firstly as a seal to prevent the infiltration of, for example, dust or liquid into the opening and therefore for example into a vehicle interior space. Furthermore, the bellows is secured (in a positively locking manner) in its position so as to be prevented from slipping out by the collar.

Figure 2:
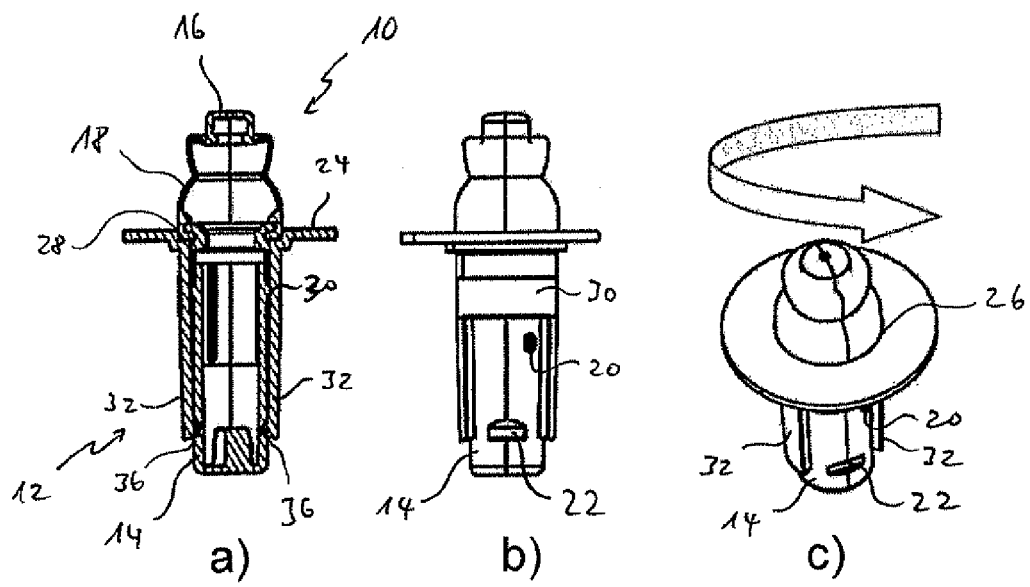
Figure 3:
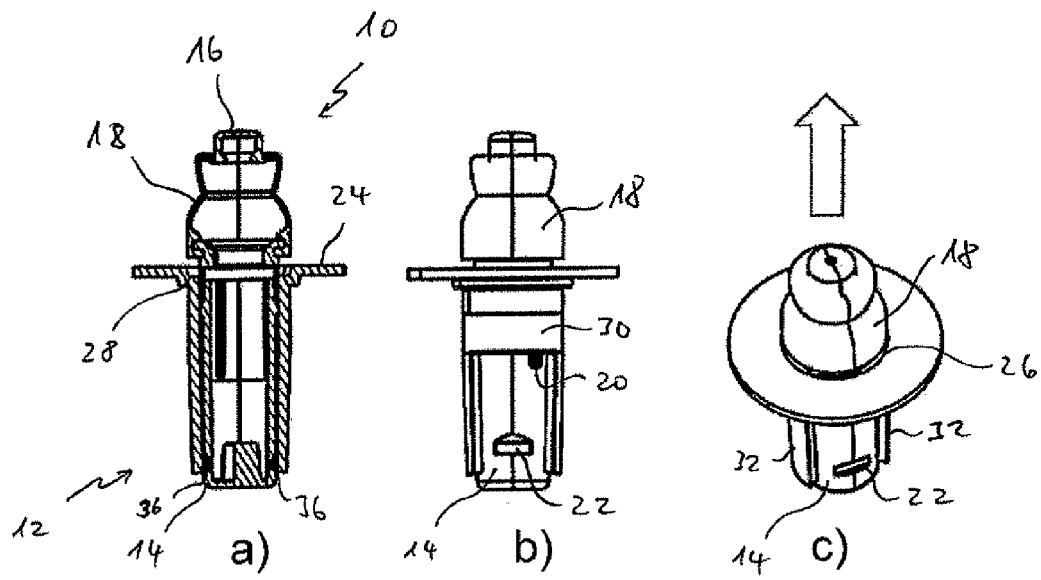
Figure 4:
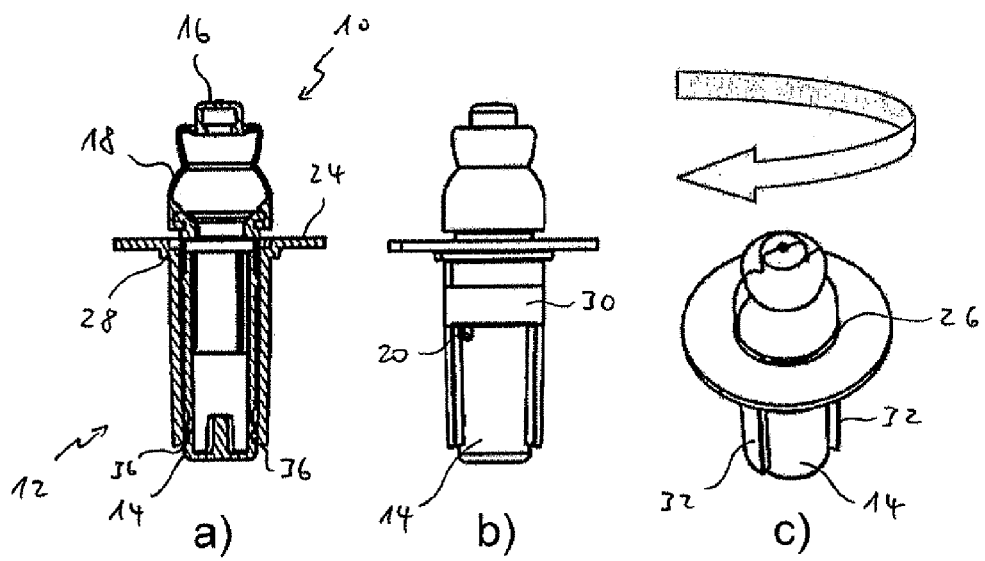
Figure 5:
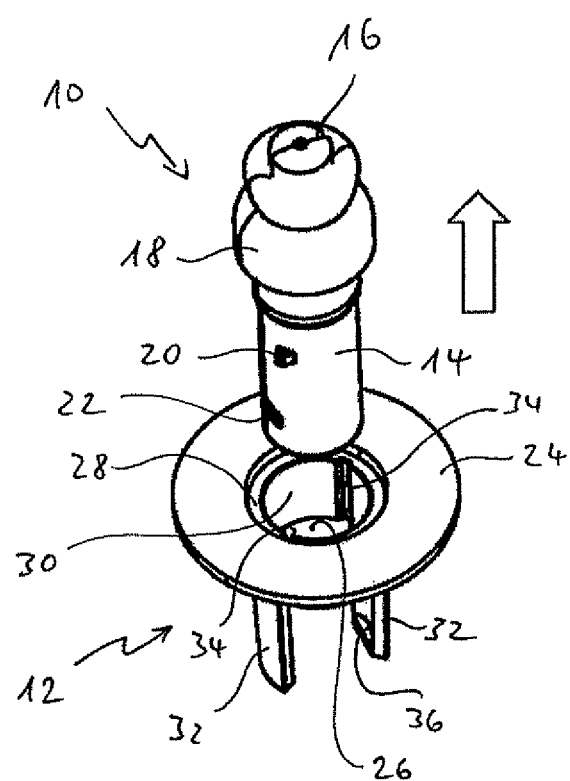

An exemplary embodiment of the invention is explained in more detail below on the basis of figures, in which, schematically:

FIG. 1 shows a fixing device according to the invention in a first operating state, FIG. 2 shows the fixing device shown in FIG. 1, in a second operating state, FIG. 3 shows the fixing device shown in FIG. 1, in a third operating state, FIG. 4 shows the fixing device shown in FIG. 1, in a fourth operating state, and FIG. 5 shows the fixing device according to the invention, in a fifth operating state.

Unless stated otherwise, the same reference symbols are used in the figures to denote the same objects. The figures illustrate a fixing device according to the invention for fixing an actuation device 10 with push-push kinematics on a component 12 of a motor vehicle, in the present case a fuel filler housing 12 which is shown in sections. FIGS. 1 to 4 each show, in sub-figure a), a cross section of the fixing device. Sub-figure b) shows in each case a side view of the fixing device, and sub-figure c) shows in each case a perspective view of the fixing device from above. FIG. 5 likewise shows a perspective view from above in a removed state.

The fixing device comprises a cylindrical housing 14 of the actuation device 10, in which the push-push kinematic mechanism itself is arranged. The design of a kinematic mechanism of said type is known per se to a person skilled in the art and is not explained in any more detail at this juncture.

To actuate the push-push kinematic mechanism, a load is exerted thereon in the longitudinal direction from above in the illustration of the figures. This takes place via an upper pressure surface 16 which actuates a plunger (not illustrated in any more detail) in the interior of the housing 14. Between the upper pressure surface 16 and the cylindrical housing 14, the actuation device 10 likewise has, in a manner known per se, a hood 18 which is composed of flexible material and which is foldable in the axial direction, in particular a bellows 18 composed of rubber. On its outer surface, the housing 14 in the illustrated example has two opposite guiding projections 20 as guiding elements 20. Furthermore, the housing 14 in the example likewise has two locking recesses 22 which are arranged offset relative to the projections 20 in the circumferential direction and in the axial direction and which are likewise arranged opposite one another. In the illustration in the figures, the locking recesses 22 are arranged below the guiding projections 20 on the outer surface of the housing. The locking recesses 22 extend in each case over a circumferential region of the housing 14. The figures show in each case only one guiding projection 20 and one locking recess 22. The second locking recess 22 and the second guiding projection 20 are arranged on the housing 14 opposite the first guiding projection 20 and the first locking recess 22.

The figures also illustrate schematically, and in sections, a fuel filler housing 12 composed of plastic. The fuel filler housing surface 24, which is shown merely as a circular cutout for simplicity, has provided in it a circular opening 26 whose diameter is substantially equal to the diameter of the cylindrical housing 14, such that the housing 14 fits exactly into the opening 26. An encircling collar 28 is formed on the rim of the opening 26, which collar 28 forms an encircling step on the rim of the opening. A hollow cylindrical guiding lug 30 extends starting from the rim of the opening 26 in the insertion direction of the housing 14. Two opposite hollow cylinder sections 32 extend from the hollow cylindrical guiding lug 30 again in the insertion direction of the housing 14. The hollow cylinder sections 32 are integrally connected, in each case at one of their ends, to the guiding lug 30 and, via the latter, are integrally connected to the rim of the opening 26. In contrast, at their other end facing away from the rim of the opening 26, the hollow cylinder sections 32 are free, as shown in particular in FIG. 5. At their free end, the hollow cylinder sections 32 are of resiliently flexible design in the radial direction. As can likewise be seen in FIG. 5, two opposite guiding grooves 34 are formed on the inner surface of the guiding lug 30. Said guiding grooves 34 run in the axial direction along the full length of the guiding lug 30. Said guiding grooves 34 end, at the lower end of the guiding lug 30 in the figures, in each case adjacent to the hollow cylinder sections 32 which extend from the guiding lug 30. In each case one locking projection 36 is formed at the lower end in the figures and on the inner surface of the hollow cylinder sections 32, with the locking projections 36 being situated opposite one another.

The function of the fixing device according to the invention will be explained in more detail below on the basis of the figures. FIG. 1 shows the fully assembled state of the actuation device 10 on the fuel filler housing 12. For this purpose, the actuation device 10 has been inserted with its cylindrical housing 14 into the opening 26 of the fuel filler housing 12 from above in the illustration of the figures. To facilitate the insertion, the housing 14 tapers slightly in the end region at its underside. An insertion of the housing 14 into the opening 26 is possible only when the guiding projections 20 of the housing 14 engage into the guiding grooves 34 of the guiding lug 30. In the illustrated example, on account of the guiding projections 20 and guiding grooves 34 which are situated opposite one another, two rotational positions in which the housing 14 can be inserted into the opening 26 are possible, said rotational positions being offset by 180°. Here, the guiding elements 20, 34 and the locking projections 36 and locking recesses 22 are designed precisely such that, in both predetermined rotational positions, the position of the locking projections 36 corresponds to the position of the locking recesses 22. In particular, during the insertion of the housing 14, on account of the contact of the housing outer surface with the locking projections 36, the hollow cylinder sections 32 are pushed radially outward slightly. When the housing 14 is inserted completely into the opening 26, the locking projections 36 then pass into the locking recesses 22 provided on the housing 14, with the hollow cylinder sections 32 being moved radially inward again in their unloaded state. In said state, the locking projections 36 and the recesses 22 latch with one another, as can be seen in FIG. 1*a*). The actuation device 10 is thereby securely fixed in the fuel filler housing 12 in the axial direction. It can be seen that, in said completely inserted state in the figures, the guiding projections 20 are situated below the guiding lug 30 and therefore below the guiding grooves 34. Furthermore, the bellows 18 of the actuation device 10 comes into contact with the step formed by the collar 28 on the fuel filler housing 12, in such a way that a seal is formed between the actuation device 10 and the fuel filler housing 12, which seal reliably prevents an infiltration of dust or liquid. Furthermore, the bellows 18 is secured against slipping out in this way.

For the removal of the actuation device 10 from the fuel filler housing 12, said actuation device 10 is firstly moved into the unlocked position shown in FIG. 2. For this purpose, the actuation device 10 in the illustrated example has been rotated approximately 90° counterclockwise, as indicated in FIG. 2*c* by the arrow. As a result of the rotation, the locking connection between the locking projections 36 and the locking recesses 22 is released, with the hollow cylinder sections 32 again moving radially outward slightly. The guiding projections 20 are situated below the guiding grooves 34 and, during the rotation, move in the free intermediate space between the hollow cylinder sections 32. The actuation device 10 is subsequently pulled slightly out of the opening 26 into the position shown in FIG. 3. This is indicated in FIG. 3*c* by the arrow. The guiding projections 20 act here as stop ribs which abut against the lower edge of the guiding lug 30 and thereby limit the pulling-out of the housing 14 in a defined manner. In said state, the locking recesses 22 are situated above the locking projections 36 as viewed in the axial direction in the figures. The actuation device 10 is subsequently rotated back clockwise by approximately 90°, as indicated by the arrow in FIG. 4*c*, into the predetermined rotational position shown in FIG. 4. Here, the locking recesses 22 are no longer in engagement with the locking projections 36. During said movements, however, on account of the abutment of the locking projections 36 against the outer surface of the housing 14, the hollow cylinder sections 32 remain in a position in which they are pushed radially outward slightly (not illustrated in the figures). In the predetermined rotational position shown in FIG. 4, the guiding projections 20 of the housing 14 are aligned with the guiding grooves 34 in the guiding lug 30. Correspondingly, the actuation device 10 may now be pulled completely out of the fuel filler housing 12 in the upward direction, guided by the guiding projections 20 running in the guiding grooves 34, as shown in FIG. 5, with the hollow cylinder sections 32 moving back into their unloaded position.

The invention claimed is:

1. Fixing device for fixing an actuation device with push-push kinematics on a component of a motor vehicle, in particular a fuel filler housing, comprising an at least in sections cylindrically formed housing of the actuation device with at least one guiding element provided on the outer surface of the housing and at least one locking recess provided also on the outer surface of the housing, further comprising an opening in the component, into which opening the actuation device can be inserted with its housing, and at least one guiding element provided on the component starting from the opening in the insertion direction of the housing, wherein the guiding element of the actuation device and the guiding element of the component, upon insertion of the actuation device into the opening cooperate such that the actuation device is guided into the opening in at least one predetermined rotational position, and further comprising at least one locking projection provided on the component starting from the opening in the insertion direction of the housing, wherein the locking projection of the component and the locking recess of the housing lock with each other upon the actuation device being inserted fully into the opening in the predetermined rotational position, and thus fix the actuation device on the component, wherein the locking can be released again by rotating of the actuation device out of the predetermined rotational position, and wherein the component comprises the at least two hollow cylinder sections extending the majority of a length of the housing.

2. Fixing device according to claim 1, characterized in that the at least one guiding element of the actuation device is at least one guiding projection provided on the outer surface of the housing, and that the at least one guiding element of the component is at least one guiding groove, said guiding groove extends starting from the opening in the insertion direction of the housing.

3. Fixing device according to claim 1, said hollow cylinder sections, each with at least one locking projection, and each, starting from the rim of the opening extending in the insertion direction of the housing and each being elastically resilient at least at their end facing away from the rim of the opening, and in that the actuation device comprises in each case at least two locking recesses corresponding to the locking projections of the hollow cylinder sections.

4. Fixing device according to claim 3, characterized in that the locking projections are each provided in the area of the end of the hollow cylinder sections, which is facing away from the rim of the opening.

5. Fixing device according to claim 3, characterized in that the hollow cylinder sections are connected with the rim of the opening and are free at their end facing away from the rim of the opening.

6. Fixing device according to claim 2, characterized in that a hollow cylindrical guiding lug extends starting from the rim of the opening in the insertion direction of the housing, and in that starting from said hollow cylindrical guiding lug, the hollow cylinder sections extend in the insertion direction of the housing and, in that the at least one guiding groove is provided in the hollow cylindrical guiding lug.

7. Fixing device according to claim 1, characterized in that on the upper side of the housing, the actuation device comprises a hood of flexible material being foldable in the axial direction and, in that the component comprises a circumferential collar at the rim of the opening, on which collar, the hood circumferentially abuts in the state fixed to the component.

8. Fixing device according to claim 1, wherein the housing is of a single piece construction.

9. Fixing device according to claim 1, wherein the housing has a closed end.

10. Fixing device according to claim 1, wherein said hollow cylinder sections are a separate component from the housing.

11. A device, comprising:

an apparatus configured to fix an actuation device with push-push kinematics on a fuel filler housing, comprising an at least in sections cylindrically formed housing of the actuation device with at least one guiding element provided on the outer surface of the housing and at least one locking recess provided also on the outer surface of the housing wherein the cylindrically formed sections are hollow cylinder sections extending majority of a length of the housing, further comprising an opening in the component, into which opening the actuation device can be inserted with its housing, and at least one guiding element provided on the component starting from the opening in the insertion direction of the housing, wherein the guiding element of the actuation device and the guiding element of the component, upon insertion of the actuation device into the opening cooperate such that the actuation device is guided into the opening in at least one predetermined rotational position, and further comprising at least one locking projection provided on the component starting from the opening in the insertion direction of the housing, wherein the locking projection of the component and the locking recess of the housing lock with each other upon the actuation device being inserted fully into the opening in the predetermined rotational position, and thus fix the actuation device on the component, wherein the apparatus is configured such that the locking of the locking projection and the locking recess with each other can be released again by rotating of the actuation device out of the predetermined rotational position.

12. The device according to claim 1, wherein the at least one guiding element of the actuation device is at least one guiding projection provided on the outer surface of the housing, and that the at least one guiding element of the component is at least one guiding groove, said guiding groove extends starting from the opening in the insertion direction of the housing.

13. The device according to claim 1, wherein said hollow cylinder sections, each with at least one locking projection, and each, starting from the rim of the opening extending in the insertion direction of the housing and each being elastically resilient at least at their end facing away from the rim of the opening, and in that the actuation device comprises in each case at least two locking recesses corresponding to the locking projections of the hollow cylinder sections.

14. The device according to claim 13, characterized in that the locking projections are each provided in the area of the end of the hollow cylinder sections, which is facing away from the rim of the opening.

15. Fixing device according to claim 13, characterized in that the hollow cylinder sections are connected with the rim of the opening and are free at their end facing away from the rim of the opening.

16. The device according to claim 12, characterized in that a hollow cylindrical guiding lug extends starting from the rim of the opening in the insertion direction of the housing, and in that starting from said hollow cylindrical guiding lug, the hollow cylinder sections extend in the insertion direction of the housing and, in that the at least one guiding groove is provided in the hollow cylindrical guiding lug.

17. The device according to claim 11, characterized in that on the upper side of the housing, the actuation device comprises a hood of flexible material being foldable in the axial direction and, in that the component comprises a circumferential collar at the rim of the opening, on which collar, the hood circumferentially abuts in the state fixed to the component.

18. The device according to claim 11, wherein the housing is of a single piece construction.

19. The device according to claim 11, wherein the housing has a closed end.

20. The device according to claim 11, wherein the cylindrically formed sections are separate components from the housing.

* * * * *